Nov. 24, 1970 H. H. WOLFF 3,542,951

HIGH RESOLUTION LOW DISTORTION TELEVISION SYSTEM

Filed May 29, 1968 5 Sheets-Sheet 1

INVENTOR.
Hanns H. Wolff
BY
John F. Miller Agent
John M. Pearce
Attorney

INVENTOR.
Hanns H. Wolff
BY John J. Miller Agent
John M. [signature]
Attorney

INVENTOR.
Hanns H. Wolff
BY John F. Miller Agent
John M. ... Attorney

INVENTOR.
Hanns H. Wolff
BY John F. Miller Agent
Attorney

Nov. 24, 1970 H. H. WOLFF 3,542,951

HIGH RESOLUTION LOW DISTORTION TELEVISION SYSTEM

Filed May 29, 1968 5 Sheets-Sheet 5

INVENTOR.
Hanns H. Wolff
BY John F. Miller, Agent
John M. Pease
Attorney

United States Patent Office 3,542,951

Patented Nov. 24, 1970

3,542,951

HIGH RESOLUTION LOW DISTORTION TELEVISION SYSTEM

Hanns H. Wolff, Orlando, Fla., assignor to the United States of America as represented by the Secretary of the Navy

Filed May 29, 1968, Ser. No. 733,036
Int. Cl. H04n *3/16, 3/30, 7/18*
U.S. Cl. 178—6.8 9 Claims

ABSTRACT OF THE DISCLOSURE

Synchronizing signals are alternately switched between two sets of sweep voltage generators which are respectively connected to the horizontal and vertical deflection systems of the cameras and display tubes of a television system. The alternation of sync pulse inputs improves resolution by better utilizing the band width capabilities of the system. The line deflection and field sweep voltage generators may be adjusted to achieve a linear scan. Thus a clear, distortion-free picture is obtained.

BACKGROUND OF THE INVENTION

This invention is in the field of television. A continuing problem in television has been the attainment of adequate resolution so that small details in the scene observed are discernible. Another serious and interrelated problem of long standing has been the avoidance of distortion in the picture. Heretofore only a limited success has been achieved in solving these basic problems.

SUMMARY OF THE INVENTION

A solution to the twin problems of insufficient resolution and too much distortion in a television system is the primary object of this invention. A solution to the problem of insufficient resolution is attained by providing dual sets of line deflection voltage generators and field sweep voltage generators for each camera and for each picture tube in a television system, together with means for alternately switching the line and field sync pulse inputs between the line and field sweep generators of the dual sets, after each frame. A solution to the second problem is achieved by supplying an adjustable correction voltage generator for each line and field sweep voltage generator which can be adjusted so that the voltage (or current) furnished the camera and cathode ray tube deflection systems is of the exact waveshape necessary to cause the electron beams of each camera and picture tube to scan at the exact rate and in the exact path necessary to secure a distortion-free picture.

DESCRIPTION OF THE PREFERRED EMBODIMENT

This invention will improve the effective resolution of television systems without increasing the band width requirements and will substantially eliminate distortion in the picture caused by imperfect deflection voltages. These objects are achieved by better utilization of the resolution limiting band width capabilities of the system and the use of improved deflection voltage generating means.

Figure 1:
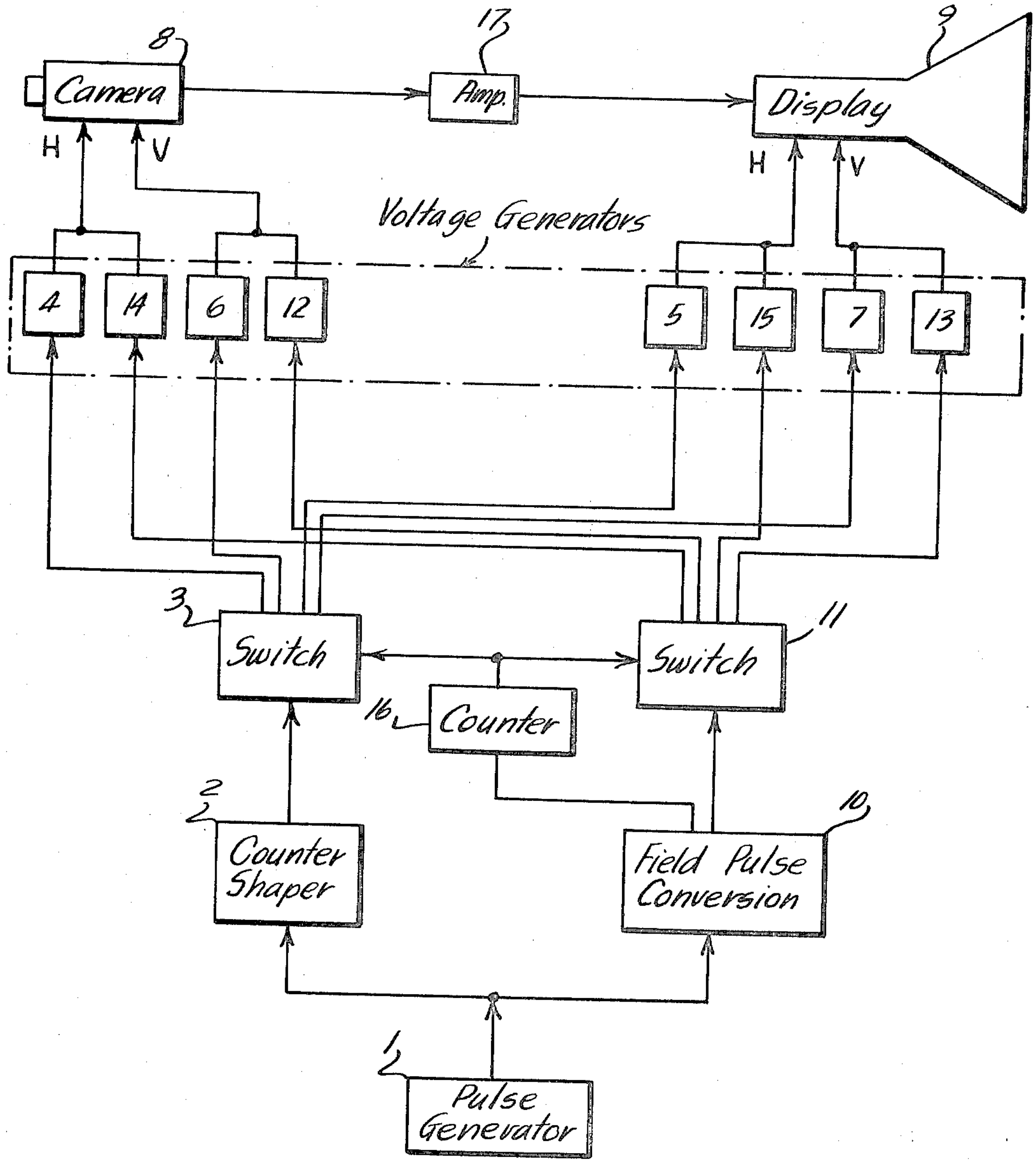
FIG. 1 is a block diagram of the raster switching circuits of the invention.

The invention consists of apparatus for effecting a change of the raster arrangement, switching from a horizontal scan to a vertical scan and vice versa, continuously alternating between the different scanning directions, and adjustable deflection voltage generating means, for preventing distortion in the picture. Such a raster switching system is especially easy to arrange if the picture is of a square format. A block diagram of a possible raster switching circuit configuration is shown in FIG. 1.

A pulse generator 1 feeds pulses to a pulse counting and shaping circuit 2 that releases line sync pulses to a switching circuit 3 which after each frame switches the line sync pulses from the line deflection signal generators 4 and 5 to the line deflection signal generators 6 and 7, switching thereby the line scan from the horizontal to the vertical deflection systems of the camera 8 and the display tube 9. At the same time the field sync pulses that are released from the field pulse conversion system 10 to the switch 11 are switched from the field sweep generators 12 and 13 of the vertical deflection systems of camera 8 and display tube 9 to the field sweep generators 14 and 15 that are associated with horizontal deflection systems of camera 8 and display tube 9.

The switches 3 and 11 are controlled by pulses that are released from a counter 16 which releases switching pulses to switches 3 and 11 after each frame (that is, in the given single interlace example, after each second field pulse).

17 is a video amplifier that connects camera 8 and display tube 9. The required power supplies are not shown.

In television systems, in addition to improving effective resolution, it is highly desirable to avoid distortion which is due to deficiencies (nonlinearities) in the camera and display tube deflection systems and/or deficiencies (nonlinearities) in the deflection sweep generators.

A distortion-free picture is especially important if the direction of the raster is changed, as for example, in a system in which a horizontal raster is alternated with a vertical raster as heretofore described. Therefore, this invention also concerns a method and apparatus which make it possible to shape the sweep voltage of an electrostatic deflection system (or equivalently the deflection current of an electromagnetic deflection system) so that the distribution of the picture features is presented on the viewing screen in undistorted fashion.

This is accomplished by providing, preferably evenly distributed, signals during the sweep period (both in the line deflection and in the frame/field sweep period) which release signals that modify the slope of the line deflection and field sweep signal generators.

Figure 2:
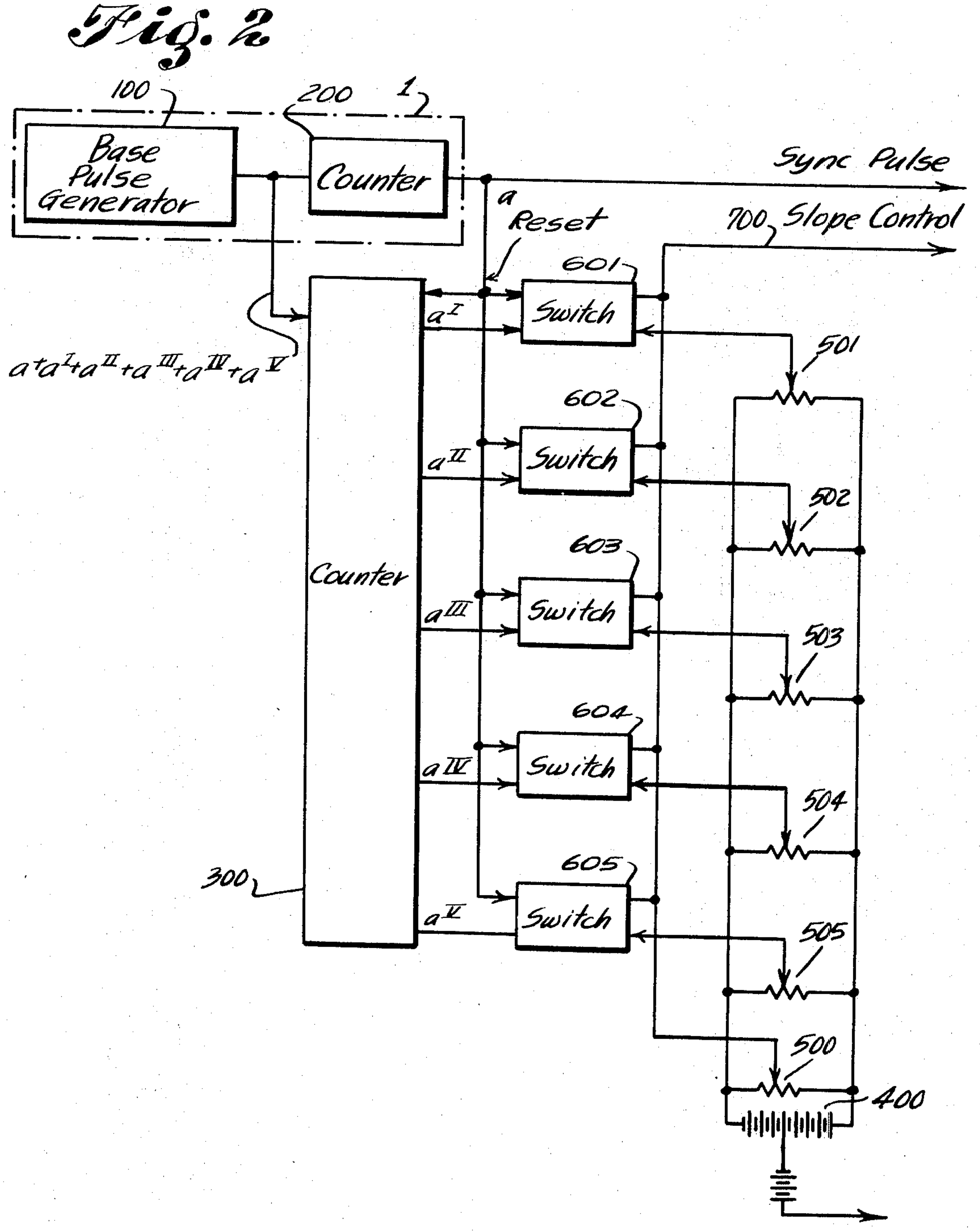
FIG. 2 is a block diagram of a slope control voltage generator.

FIG. 2 shows the preferred embodiment of a slope control voltage generator.

A base pulse generator 100 generates $n \cdot p$ pulses per second where $n$ is the intended sync pulse repetition rate and $p$ is an integral number. Base pulse generator 100 therefore provides $p$–1 pulses occurring along each sweep.

A counter 200 is provided that releases every $p$th pulse, that is $n$ pulses per second, which form the sync pulses for the system. Base pulse generator 100 and counter 200 together comprise the pulse generator 1 of FIG. 1. The $n \cdot p$ base pulses per second are fed to a counter 300 that releases correction pulses in sequence; that is, the pulse series starting after each sync pulse and ending before the next sync pulse occurs, over the lines $a^{I}$, $a^{II}$, $a^{III}$, etc. In the case it it assumed that $p=6$, that is 5 correction pulses are generated up to the $a^{V}$ line. The sync pulse output of counter 200 is connected by the reset line shown to reset counter 300 and a plurality of switches 601–605 $n$ times per second.

A slope control voltage source 400 is provided which feeds slope control potentiometers 500, 501, 502, 503, 504, and 505. Potentiometer 500 provides the base slope control.

The $a^{I}$ pulse controls an electronic switch 601 which upon appearance of the $a^{I}$ pulse connects the slope correction voltage provided by potentiometer 501 to the slope control line 700.

This correction voltage stays on the slope control line 700 until the next sync pulse turns the switch 601 into the off position again.

Similarly when the $a^{II}$ pulse appears it turns on electronic switch 602 which feeds the slope control voltage provided from potentiometer 502 to the slope control line 700. This electronic switch 602 is also turned off again when the next sync pulse appears.

Figure 3:
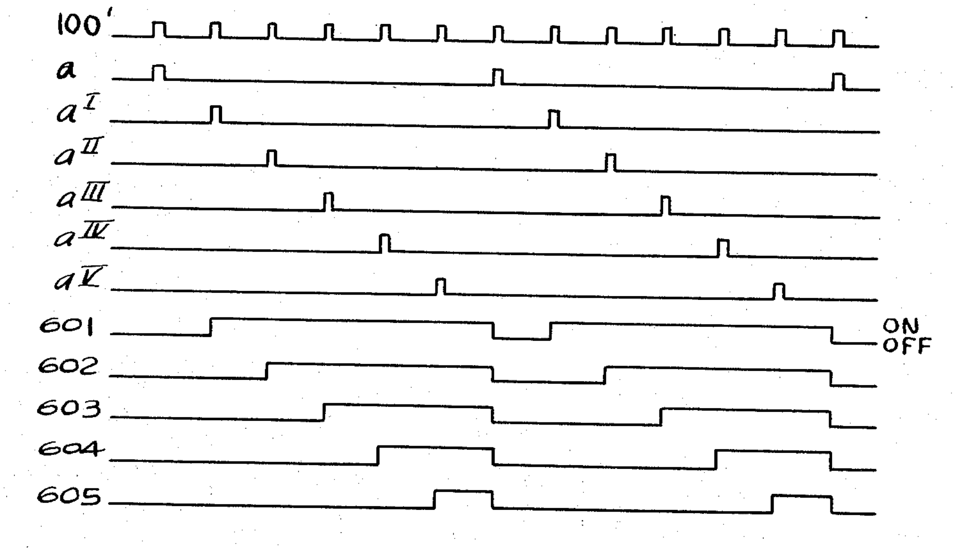
FIG. 3 illustrates voltage waveforms developed in the apparatus of FIG. 2.

FIG. 3 shows the time sequence of the pulses 100′ generated by the base pulse generator 100, the sync pulses $a$, the correction pulses $a^{I}$, $a^{II}$, $a^{III}$, $a^{IV}$, and $a^{V}$ and finally the on and off positions of the electronic switches 601, 602, through 605.

The showing of FIGS. 2 and 3 is by way of example only. The connections between counter 300 and switches 601–605 can be such that the switches can be operated in any sequence at any time, singly or in groups, and they could be reset in a similar manner if desired. Potentiometers 500–505 may be linear or non-linear. While FIG. 2 shows a one-to-one relationship between switches and potentiometers, the invention contemplates any relationship required to develop a particular voltage on slope control line 700.

Figure 4:
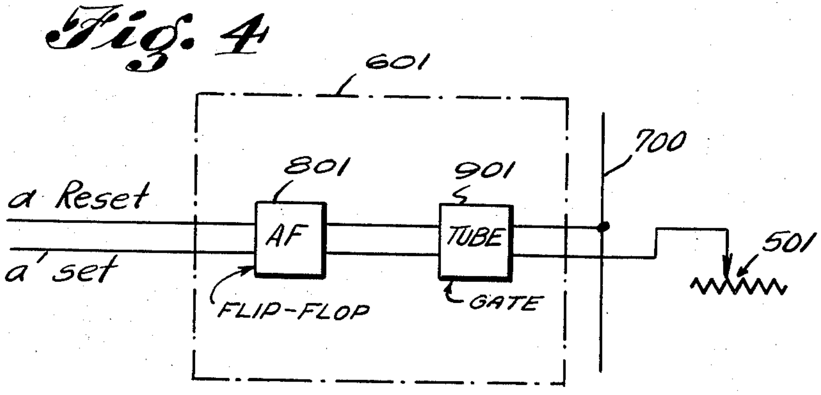
FIG. 4 shows a switch of FIG. 2 in greater detail.

FIG. 4 shows one of the electronic switches 601 and following in more detail. It consists of a flip-flop circuit 801 which controls an electronic device (tube, transistor or the like) 901. The electronic device 901 is biased to its cutoff position but is opened up as soon as the correction pulse $a^{I}$ sets the flip-flop circuit to release a signal which changes the bias of the electronic device 901 to the open position and thereby connects the slider of the potentiometer 501 to the slope control line 700. As soon as the next sync pulse $a$ appears it resets the flip-flop circuit and thereby closes electronic device 901 and disconnects the bias source 501 from the slope control line 700.

Figure 5:
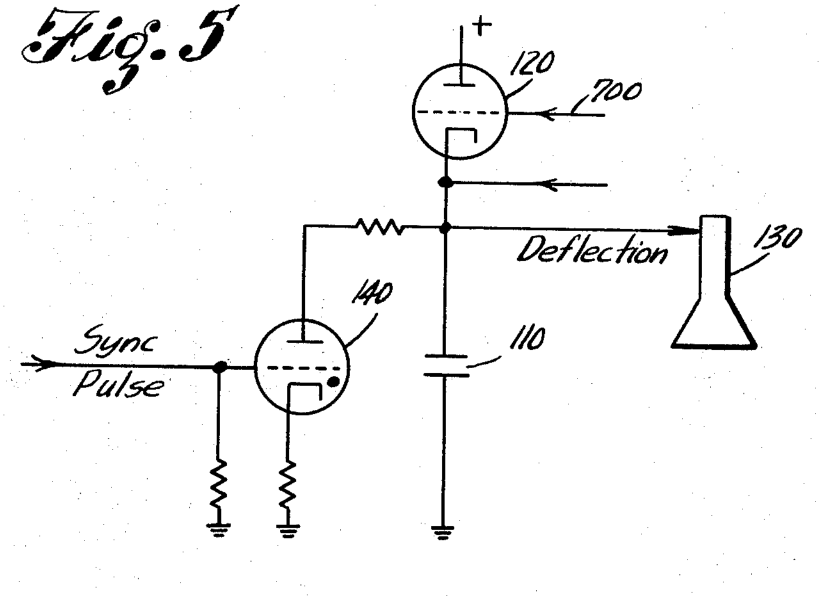
FIGS. 5, 6, and 7 are circuit schematics of sweep voltage generators suitable for use with the slope control voltage generator of FIG. 2.

FIG. 5 shows a sweep circuit which permits a slope control by the slope control voltage generator as shown in FIG. 2. The sweep circuit of FIG. 5 can be used for the generators 4, 5, 6, 7, 12, 13, 14, and 15 in FIG. 1.

A capacitor 110 is charged through an electron tube 120 which uses a saturable tungsten cathode. Depending upon the bias fed from the slope control voltage line 700 to the grid of the tube, it permits more or less current to flow from the supply voltage to the capacitor.

The system described and shown in FIG. 2 thus permits the capacitor 110 to be charged at varying rates and thereby show a voltage increase which is a function of the slope control voltage. The voltage appearing on the capacitor 110 is fed to the electro-static deflection system of a cathode ray tube 130 and deflects the cathode ray in a pre-programmed fashion. The discharge of the capacitor 110 can take place in conventional manner, for example, by a thyratron 140 which is associated with conventional circuitry and which is opened by a positive sync pulse fed to the thyratron grid.

Instead of using a saturable tungsten cathode tube as shown in FIG. 5, a pentode may be used to control the slope.

Figure 6:
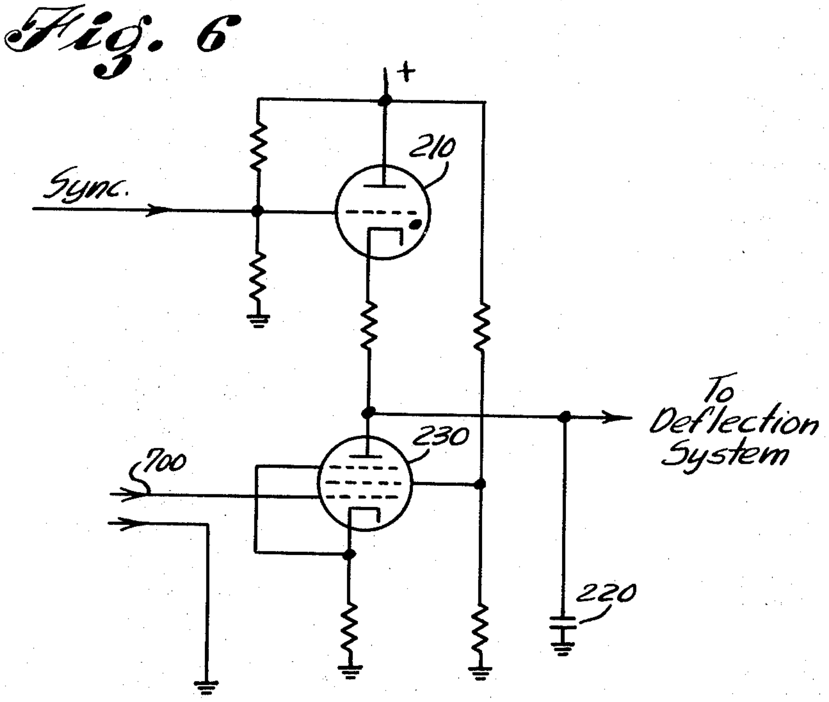

FIG. 6 shows a system in which a quick charge and slow discharge is generated, where the slow discharge is controlled by the slope control voltage generated by the slope control generator such as is shown in FIG. 2. Here a thyratron 210, upon receiving a synchronization signal at its grid, quickly charges a capacitor 220. This capacitor 220 is slowly discharged via the pentode 230 at a discharge rate which is controlled by the slope control voltage applied to its control or interception electrode.

Figure 7:
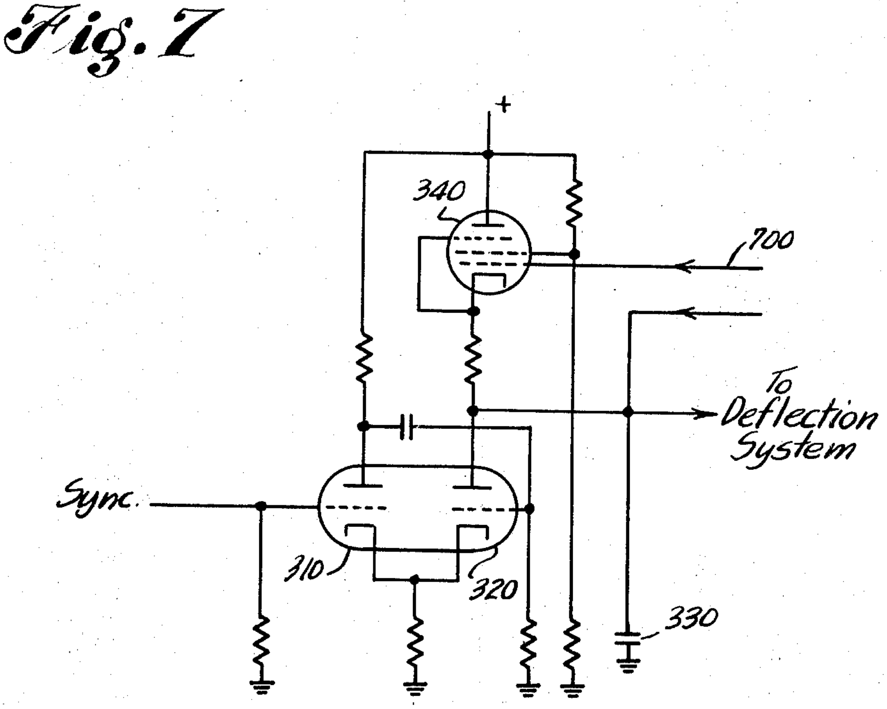

Another deflection generator is shown in FIG. 7. Here in an otherwise conventional multi-vibrator consisting of two triode systems 310, and 320, the charging capacitor 330 is charged via the pentode 340 (instead of a conventional resistor) at a rate that is controlled by the slope control voltage applied to its control grid on line 700. The sync signal is applied to the grid of triode section 310. The charging capacitor 330 supplies the deflection voltage to the deflection system of a camera, a cathode ray tube, or the like.

Each deflection signal generator in a television system can be slope controlled. In a raster direction changing system as mentioned before, eight deflection signal generators are used, one line and one frame or field deflection generator for each deflection system in the camera as well as in the display system.

In such a television system therefore which uses one camera and one display tube, four slope controlled line deflection signal generators and four slope controlled frame or field deflection generator systems are required.

Figure 8:
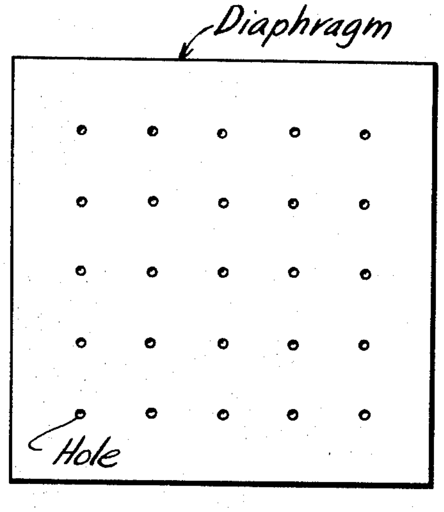
FIG. 8 shows a perforated diaphragm useful for adjusting the potentiometers in the slope control voltage generator of FIG. 2.

To adjust the slope control system, a pattern of symmetrically arranged light spots, for example, holes in a diaphragm as shown in FIG. 8, is projected onto the face of the camera tube. In scanning the pattern projected onto the camera tube the video signals derived from this scan will not coincide with the correction pulses released by the counter 300 until an adjustment of the slope control system is undertaken which makes the video signals and the correction pulses coincide.

A simple system such as a cathode ray oscillograph may be used to display the video signal and the correction pulses and thereby make the proper adjustment of the slope control possible.

After the four slope controlled sweep generators of the camera tube have been aligned, the video signal is displayed on the display tube and the adjustment of the slope controlled sweep generators of the cathode ray tube is undertaken whereby the proper adjustment can be easily checked by using a ruler.

Where operating conditions make frequent adjustment necessary, or where, for example, trained personnel are not available for making adjustments, the invention may be made self-adjusting. For example, signals derived from the camera scan of the diaphragm of FIG. 8, or an equivalent matrix of photosensitive devices located so as to sense the position of the beam of the cathode ray tube, can be forwarded through a frequency divider to a digitizer and compared with the count in counter 300. A correction signal resulting from any difference can be forwarded through appropriate switching means to a selected servo operated potentiometer or potentiometers.

The system described can be advantageously used in a periscope simulator in which high resolution and freedom from distortion are required both in horizontal and vertical direction, as is, for example, described in my copending patent applications 535,659, now U.S. Pat. 3,479,454; 580,835, now U.S. Pat. No. 3,420,953; 613,980; and 612,770.

Obviously many modifications and variations of the present invention are possible in the light of the above teachings. For example, instead of switching the sync pulses as shown in FIG. 1, the sync pulses could be fed continuously to their respective deflection signal generators and instead of the sync pulses, the generated deflection signals would be switched. Or, the camera and/or the display tube may have two horizontal and/or two vertical deflection systems, in which case, the switching system would be arranged so as to permit one horizontal and one vertical deflection system only to be operative at any one moment in the camera and in the display tube. The electronic tubes in the drawings are shown by way of example only. Solid state or other equivalent devices could be substituted as is well known in the art. It is therefore to be understood that within the scope of the appended claims the invention may be practiced otherwise than as specifically described.

The invention described herein may be manufactured and used by or for the Government of the United States of America for governmental purposes without the payment of any royalties thereon or therefor.

I claim:

1. In a television system comprising one or more television cameras and display tubes having beam deflection means, the improvement comprising:

means for scanning a television camera and picture tube in a first direction at a line deflection rate and in a second direction at a field deflection rate, means for alternately switching the scanning rates to scan in the first direction at field deflection rate and in the second direction at a line deflection rate, and adjustable means for causing the said beam deflection means to move the beams of said cameras and display tubes in preselected paths at preselected rates adjusted to minimize distortion in the picture presented on said display tube.

2. The apparatus of claim 1, wherein said preselected paths comprise groups of paths with each path parallel to the other paths within its respective group, and said preselected rates are constant rates.

3. The apparatus of claim 1, wherein said adjustable means comprise adjustable voltage generating means, and including dual sets of voltage generators connected to the beam deflection means of said cameras and display tubes and means for causing each of the dual sets to alternately generate energizing voltages for said beam deflection means.

4. The apparatus of claim 3, and including a source of synchronizing pulses, switch means connected between said source and said dual sets of voltage generators, and means for causing the said switch means to alternately change the interconnection between said source and each of said sets of voltage generators.

5. The apparatus of claim 3, wherein said adjustable voltage generating means comprise a pulse generator, a first counter connected to receive a train of pulses from said pulse generator and to divide the frequency of said pulse train by a predetermined factor, a second counter connected to receive a train of pulses from said pulse generator, a plurality of potentiometers, a like plurality of switches, a voltage source connected across each of said potentiometers, an output voltage line, control connecting means whereby said second counter sequentially operates said switches to sequentially connect said potentiometers to said output voltage line whereby the voltage on said output lines varies sequentially, and reset connecting means whereby said first counter periodically resets said second counter and said switches.

6. The apparatus of claim 5, wherein each voltage generator of said dual sets comprises a capacitator, a triode connected in a charging loop with said capacitor, said output voltage line being connected to the control grid of said triode, whereby said capacitor is charged at a rate determined by the voltage on said output voltage line, and thyratron means connected to periodically discharge said capacitor.

7. The apparatus of claim 5, wherein each voltage generator of said dual sets comprises a capacitor, a thyratron connected in a charging loop with said capacitor, a pentode connected in a discharge loop with said capacitor, said output voltage line being connected to the control grid of said pentode, whereby said capacitor is discharged at a rate determined by the voltage on said output line.

8. The apparatus of claim 5, wherein each voltage generator of said dual sets comprises a capacitor, a pentode connected in a charging loop with said capacitor, a multi-vibrator connected in a discharge loop with said capacitor, said output voltage line being connected to the control grid of said pentode, whereby said capacitor is charged at a rate determined by the voltage on said output voltage line.

9. In a television system, a correction voltage generator comprising:

a base pulse generator for generating a train of pulses, a counter for receiving said train of pulses, said counter having a plurality of output terminals, each said terminal being arranged to furnish an output signal to one of a plurality of respectively connected switches when a respective count is stored in said counter, a plurality of adjustable voltage supply means, a correction voltage output line, connecting means whereby said switches sequentially connect respective ones of said adjustable voltage supply means to said correction voltage output line, and a second counter for receiving said pulse train and for periodically resetting said counter and said plurality of switches.

References Cited

UNITED STATES PATENTS

| | | | |
|---|---|---|---|
| 3,116,436 | 12/1963 | Sweeney | 315—18 |
| 3,414,668 | 12/1968 | Adams | 178—7.7 |

ROBERT L. GRIFFIN, Primary Examiner

H. W. BRITTON, Assistant Examiner

U.S. Cl. X.R.

178—7.7; 315—18, 21